July 24, 1928.
T. MIDGLEY
1,678,017
FLEX TESTING MACHINE
Filed April 25, 1924
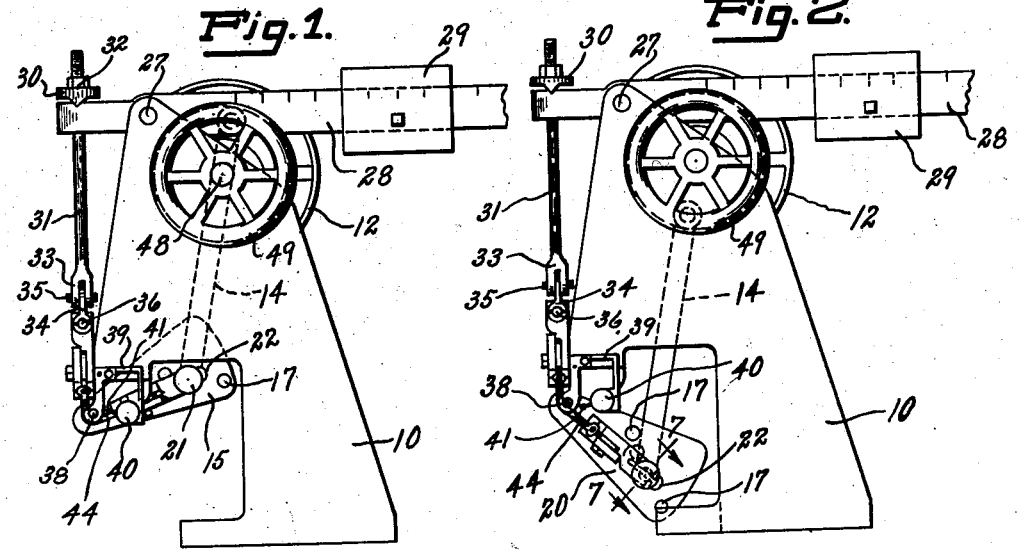
INVENTOR.
Thomas Midgley
BY
ATTORNEY.

Patented July 24, 1928.

1,678,017

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

FLEX-TESTING MACHINE.

Application filed April 25, 1924. Serial No. 709,040

This invention relates to methods of testing fibrous material and also to apparatus for testing material according to the method.

The method of testing material which is to be used in the building of articles such as automobile tire casings has generally proceeded on the theory that the test of usefulness was in the tensile strength of the material. It is my belief that this theory is fallacious, and that while tensile strength is of importance it is of equal importance to study the behavior of the material under flexing conditions such as are experienced in actual use of a tire. My invention, accordingly, has for its object a method for testing material under conditions of flexure in a manner which will give the best possible indication of the behavior of the material when built into a tire casing, and also to provide an apparatus by which this method can be practiced.

Referring now to the drawings,

Fig. 1 is a side elevation of a device constructed according to my invention;

Fig. 2 is a similar view with the parts in a different operative position;

Fig. 3 is a front elevation with the parts in the position of Fig. 2;

Fig. 4 is a plan view, partly broken away, of a testing piece and the holding members therefor;

Fig. 5 is a side elevation thereof, partly broken away;

Fig. 6 is a detail section on line 6—6 of Fig. 3;

Fig. 7 is a detail section on line 7—7 of Fig. 2; and

Figs. 8 and 9 are respectively a plan and a side elevation of a modified form of testing piece.

Before considering a method of testing, the apparatus shown in the drawings will be considered. This is supported on a frame 10 having a driving shaft 11, suitably journaled therein, upon which is mounted a pulley 12. This shaft carries a disk 13, to which is pivoted a connecting rod 14 pivoted at its lower end to a bifurcated member 15 swinging freely upon a shaft pivoted in bearings 16. On rotation of the power shaft the swinging member 15 will be shifted in rapid succession from the position of Fig. 1 to that of Fig. 2.

This swinging member is provided with a series of holes 17 through one of which passes the pivot 18 which forms the connection between the rod 14 and the swinging member 15. The purpose of this series of holes is to permit a change in the angle of flex as will be more particularly pointed out hereafter. The pivot pin 18 extends out from the side of the member, as shown in Figs. 3 and 7, and is adapted to receive the forked end 19 of a clamping member 20 shown more particularly in Figs. 4 and 5. The pivot pin has a head 21 to prevent the clamp slipping off side-ways, and is connected to it by a screw 22 passing into a threaded hole 23 in the clamping member. This member is provided with a body portion 24 and a cap piece 25 held to it by a bolt 26, the two parts being suitably shaped to clamp the test piece firmly when the bolt is tightened. The particular form of clamp used is not of importance as long as it holds the test piece securely.

Pivoted at 27 to the top of the frame is a rocking lever 28 upon which is fixed an adjustable counter-weight 29. The end of the lever opposite the counter-weight is formed to provide a seat for a knife-edged collar 30, through which passes a rod 31 adjustable lengthwise of the collar by a nut 32. The lower end of this rod is forked at 33 and has a swivel member 34 held in the forked portion by a pin 35. Through the swivel member passes a second pin 36 at right angles to the first, the lower part of the swivel member being forked, as shown in Fig. 3, so that the pin may pass through a hole 37 in a second clamping member similar to that first described except that the hole 37 replaces the slotted end previously described. Located between the two clamping members, and with its bearing surface on the axis of the bearings 16, is a rod 38 suitably secured in the frame and preferably covered with an anti-friction roller which does not clearly appear at the scale chosen for the drawings.

The operation of the device thus far described is as follows: Between the two clamping devices is supported a test piece of a character desired, the test piece being formed out of the fabric material or vulcanized rubber compound of which a test is desired. The center of the test piece rests upon the anti-friction surface of the rod 38, as shown in Figs. 1 and 2. The counter-weight is moved along lever 28 until the tension desired on the material is attained. This tension simulates the condition brought about by the air pressure in the tire. As the power shaft rotates the test piece will be flexed rapidly from the position of Fig. 1 to that of Fig. 2 and back again. Since the rod 38 is placed at the pivot point about which the rocking member 15 rotates, the condition produced in the test piece will be a flexing unaccompanied by any rubbing or sliding on the rod. Additional insurance in this regard is provided by the anti-friction covering of the rod. Located on a bracket 39 on the frame is a counter 40 of usual construction, the trip arm 41 of which is actuated by the test piece as the machine parts reach the position of Fig. 1. When breakage of the piece occurs the counter will no longer be actuated and thus an accurate record is kept of the life of the piece being tested.

The character of test piece may be that indicated in Figs. 8 and 9 in which a straight band of fabric 42 is formed with loops 43 at its ends through which may pass a rod by which the test piece may be secured in the clamping members. As the purpose of my invention is primarily to test material adapted for use in tire casings, and as the fibrous material in such casings is almost universally composed of plies of strain-resisting members arranged at oppositely disposed angles, I preferably use a test piece 44 of the nature indicated in Figs. 4 and 5. In this piece two strips, such as are shown in Figs. 8 and 9, are joined together in the form of a cross, the whole preferably being rubberized and vulcanized to form a construction of two or more plies similar to the structure of the tire carcass. Joining the ends of this cross are bent rods 45 preferably having their ends roughened or threaded as at 46 and vulcanized to the rubber of the test piece. The clamping members are preferably arranged as shown with grooves 47 to receive the bent rods so that the cruciform test piece is securely held at both ends.

In order to facilitate the replacement of test pieces in the machine, there are preferably provided devices for releasing the pressure of the counter-weight at such times as may be desired. To this end there is supported in the machine a shaft 48 having at one end a hand wheel 49 and at the other a cam 50 shown in Fig. 6. The surface of this cam contacts with the under side of the lever 28 so that when the shaft is turned into the position of Fig. 6 the counter-weight end of the lever will be raised and the rod 31 lowered so as to permit ready insertion of a new test piece.

The method of testing according to my invention should be clearly apparent from the above. The test piece, preferably constructed of plied up material having the strain-resisting members of the plies arranged at an angle to each other, is held under tension and is rapidly flexed back and forth over a surface of small curvature without producing any substantial sliding action of the material over this surface. The number of times that the flexing can be accomplished without breakage of the material will be, the tension on the fabric and the arc of flexure being the same, a measure of the life of the material in the tire. Depending upon the degree of flexure to which the material is to be subjected in use, the pivot pin 18 can be inserted in any one of the holes 17, that hole which is nearest the axis about which member 15 is pivoted producing, of course, the greatest angle of travel of the member 15, and therefore the greatest amount of flexing of the test piece.

Having thus described my invention, I claim:

1. The method of testing material comprising arranging strips of the material in a cruciform test piece so as to form a central multi-ply portion, and rapidly flexing the test piece back and forth at this central portion over a member without substantial slipping between the member and the test piece.

2. An apparatus for testing material comprising a member around which the material may be flexed, gripping means for holding the material under tension across said member, and means for oscillating the gripping means back and forth upon an axis passing through the said member.

3. An apparatus for testing material comprising a member around which the material may be flexed, an oscillating clamping member having its axis passing through said member, a second clamping member, and an adjustable tension means operating to draw the second clamping member away from said member.

4. An apparatus for testing material comprising a member around which the material may be flexed, opposed clamping members located on opposite sides of the member, means for oscillating at least one of the clamping members about an axis passing through said member, and counter mechanism operated by the material itself, whereby the number of oscillations before breakage will be recorded.

THOMAS MIDGLEY.